United States Patent [19]

Hager

[11] Patent Number: 5,150,125
[45] Date of Patent: Sep. 22, 1992

[54] HIGH DOPPLER RATE, HIGH ALTITUDE CAPABILITY COHERENT PULSE DOPPLER RADAR ALTIMETER

[75] Inventor: James R. Hager, Crystal, Minn.

[73] Assignee: Honeywell Inc., Minneapolis, Minn.

[21] Appl. No.: 632,938

[22] Filed: Dec. 24, 1990

[51] Int. Cl.⁵ .................. G01S 13/20; G01S 13/70
[52] U.S. Cl. ................... 342/120; 342/95; 342/134; 342/137
[58] Field of Search ............... 342/120, 134, 137, 95

[56] References Cited

U.S. PATENT DOCUMENTS

| | | | |
|---|---|---|---|
| 3,491,360 | 1/1970 | Stoorvogel | 342/120 |
| 3,739,379 | 6/1973 | Davis | 342/120 |
| 4,973,968 | 11/1990 | Hurd | 342/137 |

*Primary Examiner*—Mark Hellner
*Attorney, Agent, or Firm*—Albin Medved; Ronald E. Champion; Thomas J. Nikolai

[57] ABSTRACT

A pulse Doppler radar altimeter designed to resolve the ambiguous range problem associated with the use of a pulse repetition interval, which is less than the aircraft altitude, includes a radar transmitter configured to transmit first and second series of pulses where the first series has a pulse repetition interval slightly different from the pulse repetition interval of the second series. At a time when the first series is being transmitted, the receiver electronics including a range gate and a tracker searches for ground returns and positions the range gate in time coincidence with the detected ground return. Control then shifts so that the second series of pulses is transmitted and a determination is made whether overlap of the range gate with the ground return from the second series corresponds to the same altitude as when the first series was involved. If not, it is known that the detected range is ambiguous and the tracker continues repositioning the range gate (altitude) until an unambiguous range determination is made.

6 Claims, 6 Drawing Sheets

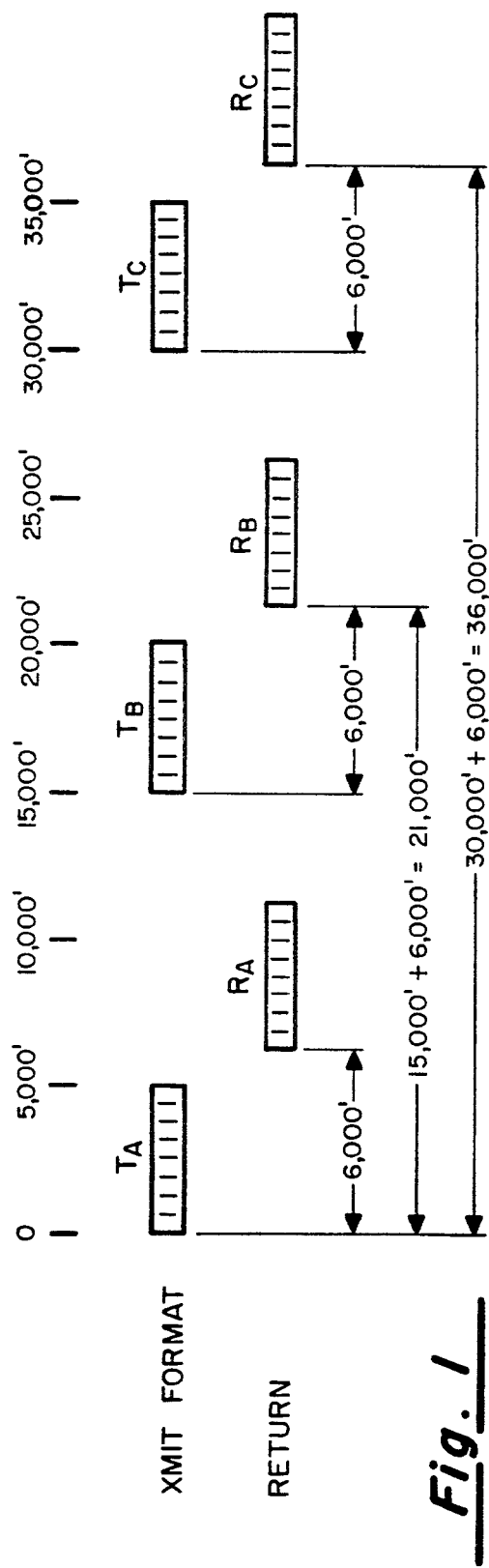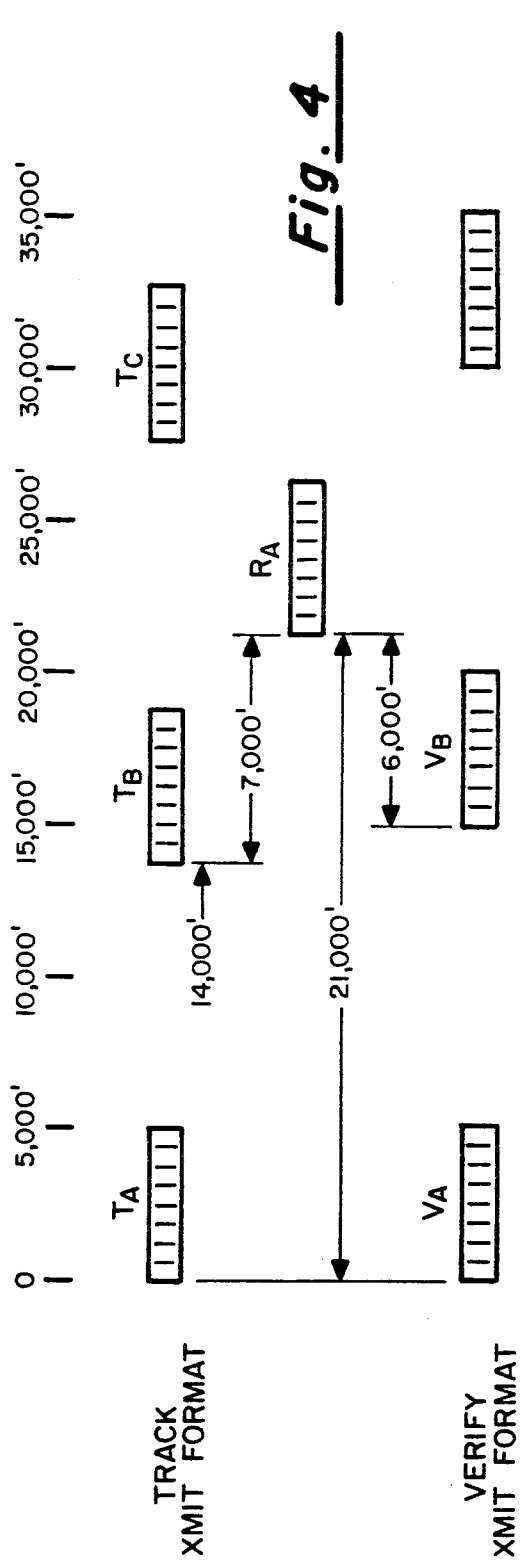

HIGH DOPPLER RATE, HIGH ALTITUDE CAPABILITY COHERENT PULSE DOPPLER RADAR ALTIMETER

This invention relates generally to a coherent pulse Doppler radar altimeter, and more particularly to a high Doppler rate, high altitude capability coherent pulse radar altimeter capable of readily discriminating between actual and ambiguous returns.

BACKGROUND OF THE INVENTION

Pulse radar altimeters demonstrate superior altitude accuracy due to their inherent leading edge return signal tracking capability. The pulse radar altimeter transmits a pulse of radio frequency (RF) energy, and a return echo is received and tracked using a closed-loop tracking system. Mission requirements for covertness and higher sensitivity, along with technological advances in terms of microminiaturization and the cost of special purpose integrated circuits have resulted in the feasibility of the more complex coherent pulse Doppler radar.

Coherent pulse Doppler radars normally incorporate a digital code which is used to biphase modulate the transmit pulse. Systems of the prior art have required relatively long code lengths and long pulse repetition intervals to provide the ambiguous range rejection required for a high range radar. The long code length, however, requires a receiver with a narrow bandwidth integration filter, resulting in insufficient high Doppler frequency processing capability required to track ground returns under high climb or dive rates and sudden terrain changes.

Prior art coherent pulse Doppler radar altimeters exhibit attributes of superior covertness, processing gain, and leading edge tracking accuracy, but suffer from insufficient sensitivity at the higher altitude climb and dive rates. This results in an altimeter which will not track the ground return under sudden terrain altitude changes, or high dive or climb conditions. Additionally, non-coherent pulse radar altimeters of the prior art provide less than a 1% duty cycle. The present invention exhibits increased sensitivity with greater than 30% duty cycle while transmitting less peak power. Thus, 140 dB loop sensitivity is achieved with a 50 milliwatt transmitter compared to presently achieved sensitivities of less than 140 dB with a 5 watt transmitter. This ability to operate at greatly reduced power, of course, enhances covertness.

The interval of time between signal bursts of a radar system is called the pulse repetition interval (PRI). The frequency of bursts is called the pulse repetition frequency (PRF) and is the reciprocal of PRI. Prior art systems that utilize a short PRI in order to be able to process high Doppler rates suffer from an ambiguous range problem.

FIG. 1 graphically demonstrates the ambiguous range problem associated with a short pulse repetition interval system. Illustrated in the line labeled XMIT FORMAT are three transmitted pulses labeled $T_A$, $T_B$ and $T_C$ which could be used with a 10,000 foot range capability radar altimeter. A 15,000 foot pulse repetition interval is used to provide up to 2,000 feet/second altitude rate change capability. If the aircraft is flying at 6,000 feet, a return $R_A$ will appear delayed 6,000 feet after each transmission and the altimeter will indicate a true 6,000 foot altitude. As further illustrated in FIG. 1, a 21,000 foot delay, when flying at 21,000 feet will also appear 6,000 feet after the second transmission $T_B$, resulting in 6,000 feet being indicated when the aircraft is actually at 21,000 foot altitude. Thus, an ambiguous range exists at 21,000 feet and, in a like manner, at 36,000 feet which is 6,000 feet following the transmitted pulse $T_C$.

FIG. 2 serves to demonstrate the ambiguous range problem associated with a short (13 bit) code or pulse length. Improper line-up or correlation of the demodulation code with the biphase coded ground return will result in an altitude error as indicated. This error can be as high as approximately 1,000 feet for a two microsecond (1,000 radar feet) wide pulse. Proper line-up or correlation of the demodulation code with the ground return will result in the correct altitude being reported. The degree to which the radar receiver processing system rejects improper code line-up or correlation is called "auto-correlation rejection".

The level of rejection is directly dependent upon the number of bits in the code, and the type of code employed. A 13-bit Barker code, for example, provides about 22 dB auto-correlation rejection, while a 5-bit Barker code provides about 14 dB rejection. Because the strength of the signal return from the ground can vary as much as 50 dB due to terrain reflectivity variances and aircraft roll, these short code lengths would result in a system incapable of rejecting the ambiguous range associated with miscorrelation of the coded ground return with the receiver demodulation code. Thus, a radar altimeter designed to process high climb, dive and terrain rate changes must necessarily have a short PRI and a short code, resulting in ambiguous range reporting due to the two effects discussed above.

SUMMARY OF THE INVENTION

It is, therefore, an object of the present invention to provide a high altitude, high Doppler rate pulse coherent radar altimeter.

It is a further object of the invention to provide a radar altimeter which will reject ambiguous range readings.

It is another object of the invention to incorporate a unique transmit format and associated processing circuitry to allow for a 35% duty cycle and provide high Doppler rate processing and rejection of ambiguous altitudes.

It is yet another object of the invention to provide a coherent pulse Doppler radar altimeter with a relatively short code and a short code repetition interval which will operate at high altitudes.

It is still a further object of the invention to provide a coherent pulse Doppler radar altimeter that utilizes a new code correlation mechanism.

Yet still another object of the invention is to time share the radar electronics between an altitude track mode and an altitude verify mode.

The system of the present invention derives absolute altitude by transmitting a pulse radio frequency signal to the ground, receiving the reflected signal, and tracking its leading edge. Altitude data is provided by precisely measuring the transit delay between the transmitted signal and the received signal. The coherent pulse radar altimeter uses a time-based, bi-phase coded pulse modulation of the transmitted signal to provide unambiguous ranging to altitudes in excess of 50,000 feet. The system has the advantage of a coherent modulation format (low accessible bandwidth), high duty cycle (low peak power), and conventional pulse type modulation format (superior altitude resolution and wide output emission spectrum).

Another feature of the present invention is that the radar altimeter provides range gating and code correlation before detection in the receiver RF section, thereby allowing predetection integration and the associated processing gain improvement over post detection integration. Another inherent advantage of range gating and correlation taking place ahead of detection is that the RF bandwidth can be very large with respect to the narrow pulse width frequency spectrum, thus providing no edge distortion to the return commonly experienced in post detection gated systems.

The radar system of the present invention includes timing and control means coupled to a transmit format generator which allows a first train of bi-phase coded pulses of a predetermined first PRI to be sent out during a first time (verify) interval and a second train of such pulses having a slightly different PRI sent out during a second (track) interval. The range gate in the receiver section of the altimeter is initially operated in a search mode where the range gate is set to an altitude of zero feet. A tracking loop controlling the range gate causes it to be slid outbound until it detects the return energy passing through the range gate. At this point the detected altitude established by the range gate position is stored. A mode switch which is used to time multiplex the receiver electronics next places the system in the track mode with the return being tracked starting at the detected altitude previously stored. The system remains in the track mode for a predetermined time interval, e.g., 8 milliseconds and at the end of that interval the final track altitude is stored. The mode switch then returns to the verify mode position where it remains for a further 8 millisecond time interval. The receiver electronics continuously operates to sense whether the range gate overlaps radar return energy and if during the verify mode, no such overlap occurs, it is known that the return was ambiguous and the range gate is set to the final track altitude, i.e., the range gate position existing at the end of the verify mode interval. Control then passes to continue to slide the range gate outbound in an attempt to detect an overlap with a return. The receiver effectively loses track and the system returns to a search mode. However, if during the 8 millisecond verify mode an overlap of the range gate with return energy had been detected, the power level of the transmitter is adjusted and then during the subsequent 8 millisecond track mode, the detected return is tracked starting at the final track altitude which had been stored during the preceding track mode sequence.

It can be seen, then, that when the receiver breaks track, it was an ambiguous range that was involved and it is effectively ignored.

Other objects, features and advantages of the present invention will become apparent to those skilled in the art from the following detailed description of the preferred embodiment, especially when considered in conjunction with the accompanying drawings.

BRIEF DESCRIPTION OF THE DRAWINGS

FIG. 1 is a diagram helpful in illustrating the ambiguous range problem;

FIG. 4 is a graphical representation helpful in understanding the ambiguous range rejection technique of the present invention;

DESCRIPTION OF THE PREFERRED EMBODIMENT

Figure 2:
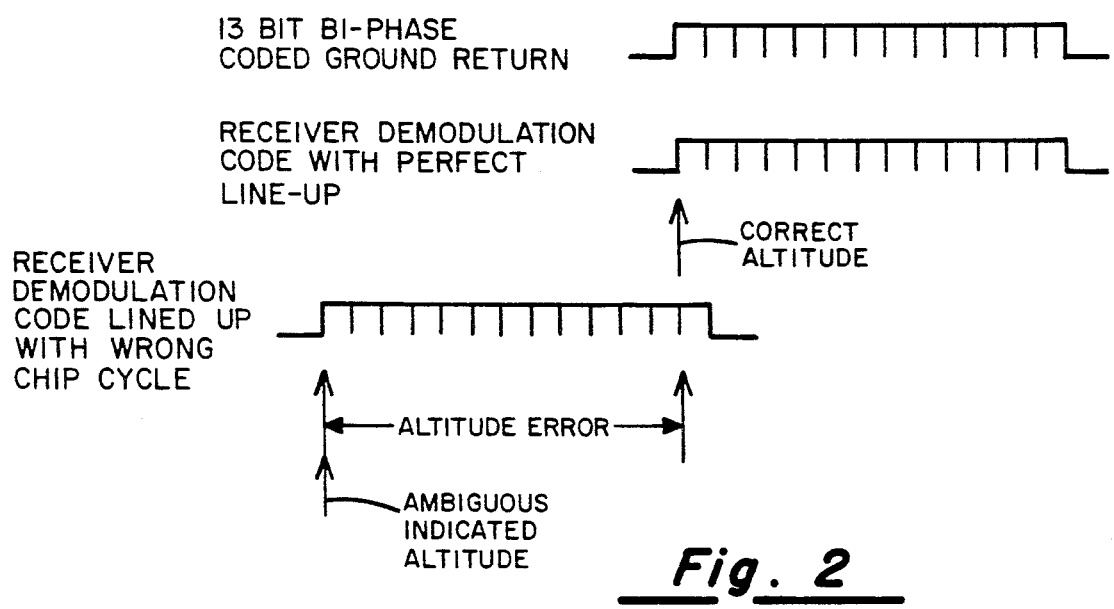
FIG. 2 illustrates diagrammatically the ambiguous range which may be due to improper line-up of the coded ground return with the receiver demodulation code.
Figure 3A:
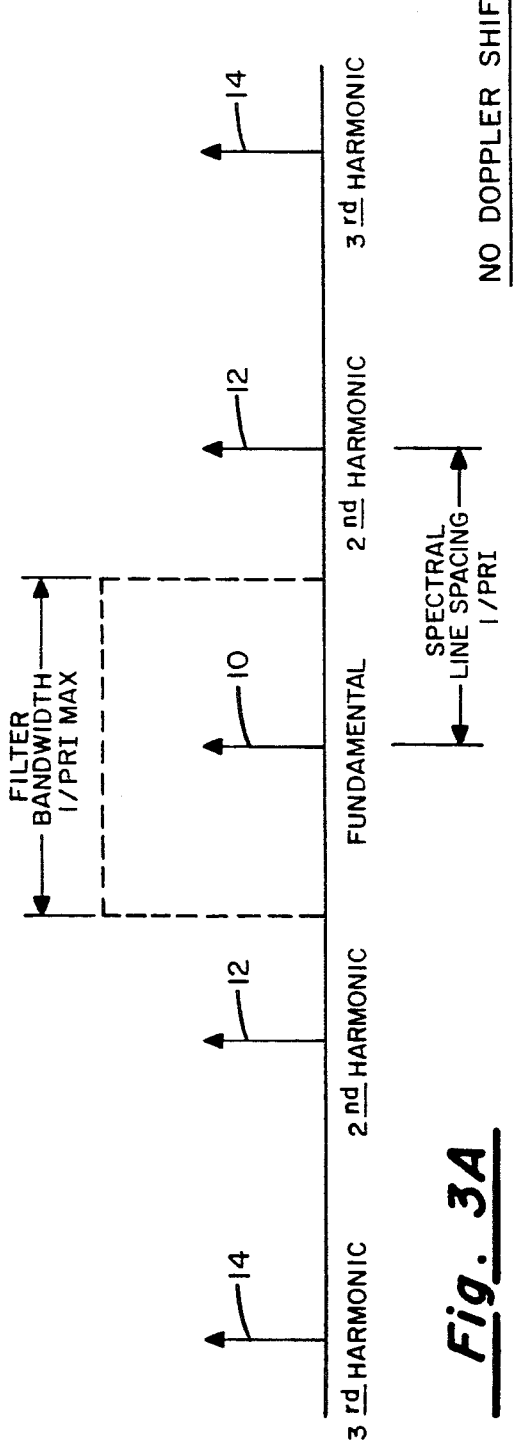
FIGS. 3A and 3B show a diagram of the transmit frequency spectrum associated with the coherent pulse Doppler radar altimeter transmit format when unshifted and when Doppler shifted, respectively.

FIG. 3A illustrates the transmit frequency spectrum associated with the transmit format of the invention. The fundamental frequency is represented by arrow 10 while the second and third harmonic frequencies represented by the arrows 12 and 14. The receiver bandwidth requirements dictated by the aircraft altitude rate change specifications are outlined by dashed lines centered over the fundamental frequency plot. The diagram of FIG. 3A also represents the return signal frequency spectrum when no Doppler shift is involved.

Figure 3B:
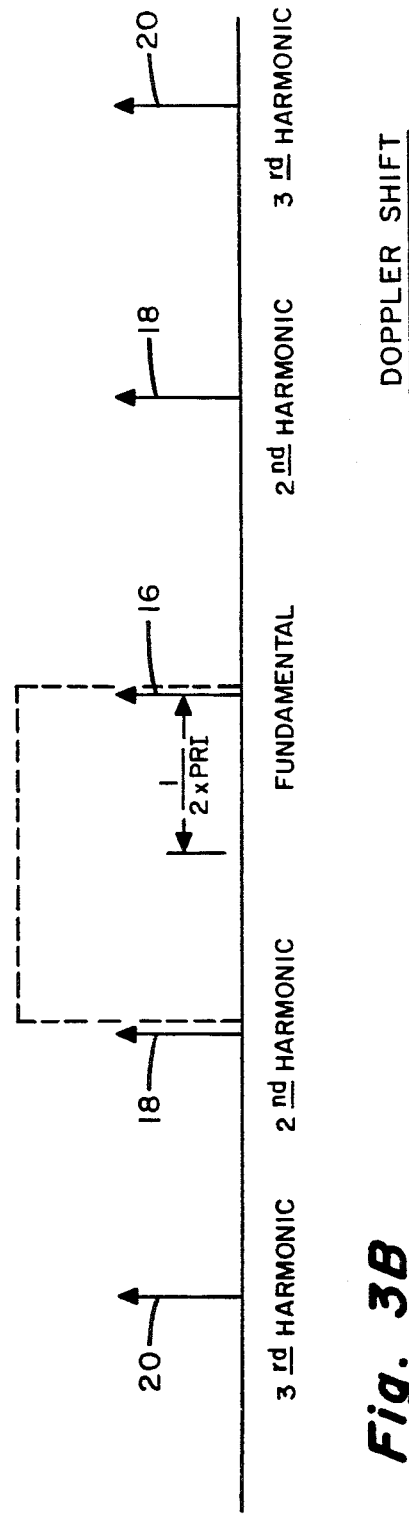

A typical maximum required altitude rate of change of 2,000 feet per second is required for modern aircraft and will create a Doppler shift of the return spectrum of about 17KHz at the normal 4.3 GHz altimeter operating frequency. Since only the fundamental frequency 10 can be used for correlation, the receiver bandwidth must enclose only the fundamental frequency while rejecting the harmonics represented by arrows 12 and 14. Thus, as illustrated by the Doppler shifted return spectrum of FIG. 3B, the filter must be wide enough to pass maximum expected Doppler shifts of the fundamental frequency 16, which, in this example, is ±17KHz. In addition, the spacing of the harmonics 18 and 20 must be such that the Doppler shift does not shift them into the pass band of the filter, which is 34KHz minimum in the example under consideration. Because the PRF is equal to the harmonic spacing, it must be no less than 34KHz as in this example. Therefore, the maximum allowable pulse repetition interval is 1/34KHz or about 30 microseconds which is equivalent to a radar range delay of about 15,000 feet. Using a 15,000 foot PRI, however, will give rise to the ambiguous range problem.

As explained at page 2, the situation can exist where an ambiguous return signal may be detected by the receiving antenna of the radar altimeter system. In any given track sequence, a number of return signals can be interpreted by the radar. This is due to the PRI (in radar feet) being less than the actual altitude of the aircraft, resulting in more than one ground return signal being in the air, i.e., between the ground and the aircraft, at any given time.

Even though the range gate of the receiver is open on a valid pulse, that pulse might actually lag the original timed pulse. A method is therefore needed to resolve this ambiguity, i.e., determine whether a pulse is the correct one or not. In accordance with the present invention, two pulse beams with different pulse repetition intervals are used and, as a result, if the two beams yield two different ranges, then the track range indication is determined to be ambiguous.

The drawing of FIG. 4 helps to illustrate the ambiguous range rejection technique of the present invention. Two transmit formats, referred to as track and verify, are time shared. The track format has a PRI that is slightly different from the PRI of the verify transmit format and is used for tracking the return signal. The verification format is used for searching the return signal and also for return signal level sensing and control. As mentioned, it is only required that the two PRIs be slightly different and track transmit format PRI either slightly less than or slightly greater than that of the verify PRI. FIG. 4 shows the case where the track transmit PRI is 14,000 radar feet while the verify transmit PRI is 15,000 radar feet.

If the range indication resulting from the track and verify formats do not produce an identical altitude indication, the range is determined to be ambiguous. This is distinguishable from prior art radar altimeter systems which have incorporated a track loop and a level sensing loop, operating in parallel, at the same time, on the same return signal. The level sensing channel senses and controls the amplitude of the return signal. Ground reflectivity variations result in return signal level variations. The gain control loop including this sense mechanism holds the return signal at a constant amplitude for accurate leading edge tracking. Normally, separate range gates for track and level channels are incorporated downstream of the signal detection. In the case of the present invention, however, range gating and code correlation occurs prior to detection in the receiver RF section, thereby allowing predetection integration and the associated processing gain improvement over post-detection integration. The gating in the wide bandwidth RF section eliminates distortion of the leading edge of the return signal pulse, resulting in improved altitude accuracy. To eliminate the need for two channels of processing, a single gate/correlator is time-shared between track and verify (level sensing) functions. The time sharing of the receive portion of the radar allows the separate transmit pulse repetition intervals for track and verify required to provide the desired ambiguous range rejection.

Figure 5A:
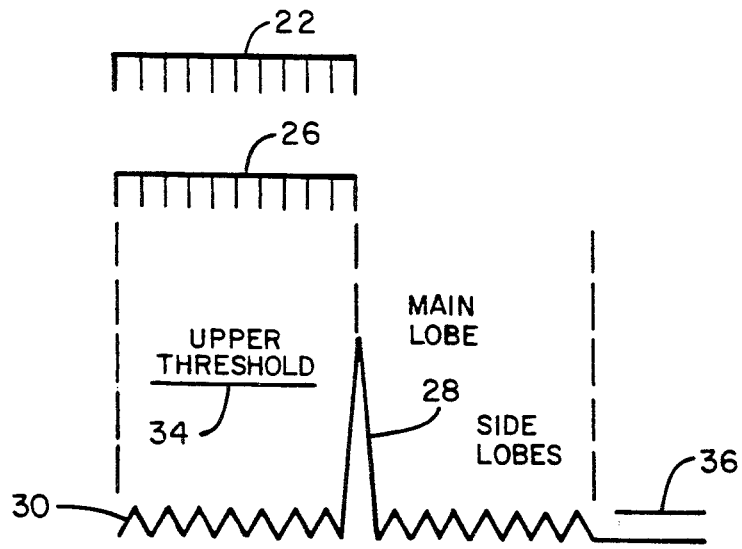
FIG. 5A is a diagram illustrating the auto-correlation function for a relatively short code word.
Figure 5B:
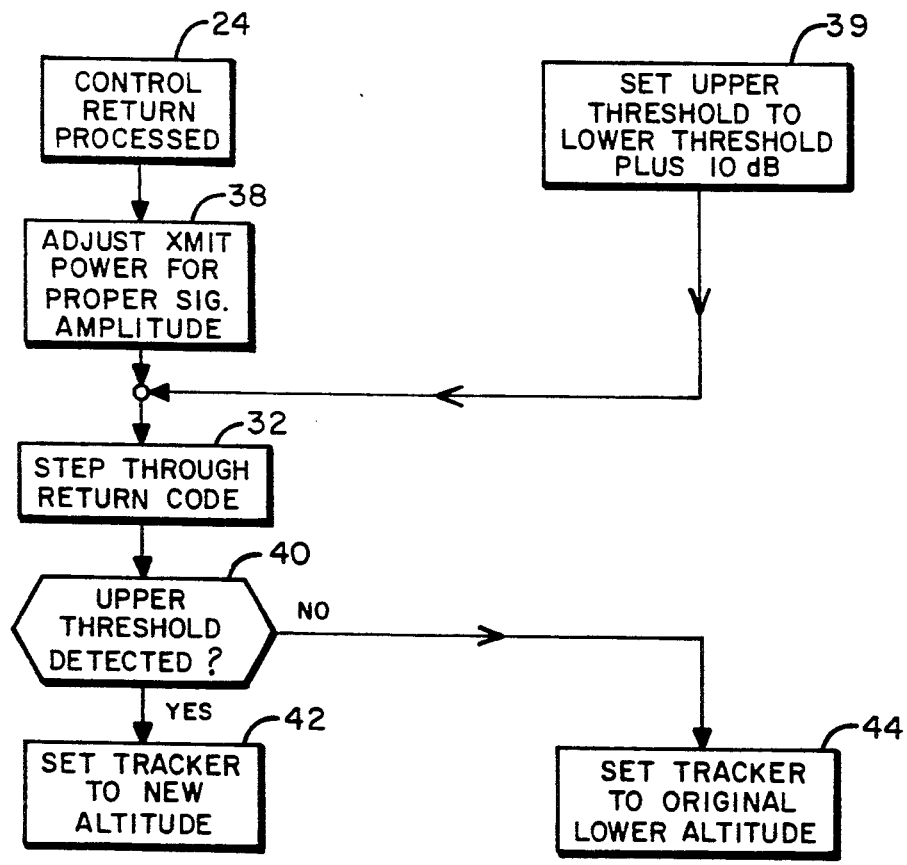
FIG. 5B is a flow diagram of the algorithm used to reject side lobes for eliminating ambiguous range due to improper code line-up.

FIG. 5A illustrates the auto-correlation function for a relatively short code word 22 and the flow diagram of FIG. 5B demonstrates the auto-correlation side lobe rejection enhancement technique required to eliminate the ambiguous range due to improper code line-up due to short code length. The return is bi-phase modulated and, as indicated by FIG. 5B, is received by a processor (block 24). Included in the receiver is a source of modulation code 26. When the altitude delay code 26 perfectly lines up with the return signal 22 as illustrated in FIG. 5A, the main lobe 28 of maximum energy is produced. As the code is misaligned in either direction, low amplitude side lobes 30 are produced. The auto-correlation rejection ratio, i.e., the main lobe 28 to side lobe 30 ratio is a function of code length.

Ground tracking radar altimeters must operate over extreme signal level variation due to reflectivity variances of over 40 dB and antenna pattern variances of over 20 dB as the aircraft rolls and pitches. Thus, to assure proper range tracking, and correct altitude reporting, the side lobes 30 should be at least 60 dB down from the main lobe 28 so as to assure tracking of the main lobe and not a side lobe. The code length required in prior art systems to produce 60 dB side lobes is such that the pulse repetition interval is increased beyond the Doppler processing limitations. The method of the present invention tracks the main lobe with only a 10 to 20 dB main to side lobe ratio, allowing use of a short code length.

Referring again to FIG. 5B, the radar, after detecting the return steps the code 26 through the return pulse 22 in predetermined time increments as indicated by block 32. In an attempt to locate the main lobe 28 position, the upper threshold 34 is set about 10 dB greater than the lower threshold 36. The return signal is detected during the search return. The automatic level control loop adjusts the transmit power for a proper signal level (block 38). This signal level is then held as the modulation code 26 is stepped through the return pulse 22 in search of an upper threshold. The tracker is positioned to the altitude indicated by the upper threshold set on the main lobe following the detection of the upper threshold (blocks 40 and 42). If an upper threshold is not detected, the tracker is set to the original altitude indicated by the original lower threshold main lobe (block 44) as it is correctly assumed that the code was initially properly lined up.

Figure 6:
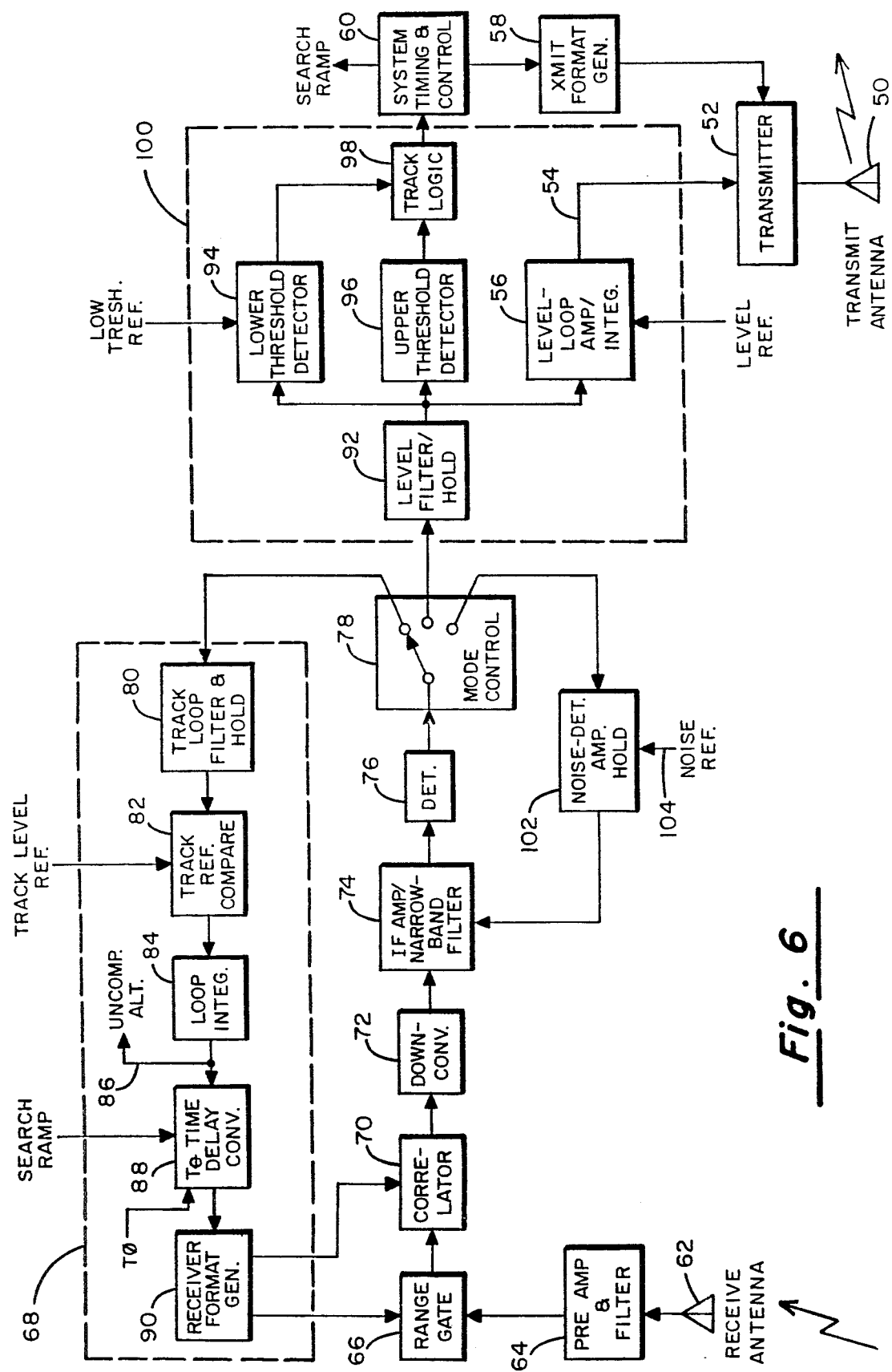
FIG. 6 is a high level block diagram of the coherent pulse Doppler radar altimeter in accordance with the present invention.

FIG. 6 is a functional block diagram of a coherent pulse Doppler radar system incorporating the novel features of the present invention. Those skilled in the art will recognize that the system of FIG. 6 can be implemented in a variety of ways. It can comprise discrete digital logic circuitry, a programmed microprocessor or may be analog in nature.

Figure 7:
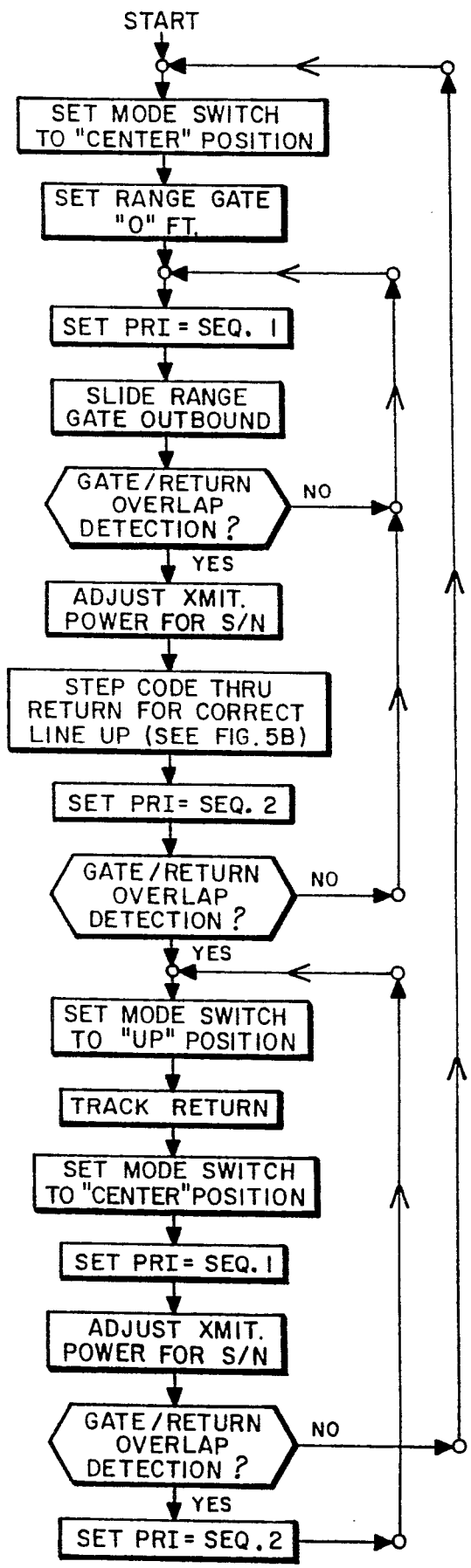
FIG. 7 is a flow diagram helpful in understanding the mode of operation of the system of FIG. 6.

FIG. 7 is a software flow diagram assuming that the system of FIG. 6 is implemented using a programmed microprocessor. The system is seen to include a transmitting antenna 50 which is operatively coupled to the output of a high frequency transmitter 52 whose power level is adjustable, via a control signal on line 54, emanating from the level loop amplifier/integrator circuit 56. The format of the transmitted pulses including the bi-phase coding and the pulse repetition interval is set by the transmit format generator 58 which, in turn, receives control signals from the system timing & control module 60.

The radar altimeter also incorporates a receiving antenna 62 for detecting ground return signals which are fed via a preamp/filter circuit 64 to the range gate 66. The opening and closing of the range gate is controlled by a tracking loop shown enclosed by broken line box 68. Radar return energy passing through the range gate is applied to a correlator circuit 70 and from there to a down-converter 72 and an intermediate frequency amplifier/narrow band filter 74 before being applied to the detector circuit 76.

In accordance with the present invention, the detector output is applied to a mode control switch 78 which, for purposes of illustration only, is shown as being a mechanical single pole, triple throw switch. In practice, of course, the mode control switch 78 would be electronic in nature or implemented in software. When the switch arm is in the position illustrated, the track loop circuitry 68 is effectively coupled between the output from the detector 76 to the range gate 66 and correlator 70. The track loop includes a track loop filter & hold circuit 80 whose output feeds a track reference compare circuit 82. The output of that circuit, in turn, feeds the loop integrator 84 whose output on line 86 constitutes the uncompensated aircraft altitude voltage. This voltage is applied to a voltage-to-time delay converter 88 which determines the extent to which the transmit pulse $T_0$ will be delayed before being applied to the receiver format generator 90. It is the output of the receiver format generator which controls the opening and closing of the range gate 66 and code line up within the correlator 70.

When the mode control switch 78 is in the center position, the system is said to be in its verify mode and, in particular, the output from the detector 76 will be applied to a level filter/hold circuit 92. The output from the level filter & hold circuit 92 is applied along with a low threshold reference signal to the lower threshold detector 94 and to an upper threshold detector 96. The output from the two detectors 94 and 96 is applied to the track logic module 98 whose output is applied to the system timing and control circuit 60. For convenience, the circuitry shown enclosed by the broken line box 100 may be referred to as the level sense channel.

When the mode control switch 78 is in its lowermost position, the output of the detector 76 is fed back through the noise detect amplifier & hold circuit 102 to the input of the IF amplifier/narrow band filter 74.

Having described the functional blocks comprising the coherent pulse Doppler radar apparatus, consideration will be given to its mode of operation and, in this regard, attention is directed to FIG. 7. System timing and control circuit 60 generates a time mark, $T_0$, with a predetermined pulse repetition interval and which causes the transmit format generator 58 to generate a bi-phase coded transmit pulse which is sent out over the transmitting antenna 50. The pulse is reflected from the ground and one altitude delay period later will be received by the receiving antenna 62. The return signal is amplified by preamplifier circuit 64. The tracker loop identified by numeral 68 functions to place the range gate 66 at the proper time positions to pass the return signal emanating from the preamp 64 and also applies the code 22 in FIG. 5A, at this same time position, to the correlator 70 where the bi-phase modulated return is demodulated. The down converter 72 operates in a conventional fashion to convert the RF energy to a lower IF frequency for processing by the IF amplifier and narrow band filter 74. The pulses of the demodulated (CW) energy are integrated by the filter portion of circuit 74 and then are peak detected by the detector 76.

The signal or mode switch 78, when in the position shown, directs the detected voltage level to the track loop adaptive filter & hold circuit 80 where it is band limited to maximize available signal-to-noise ratio. The band limited level is compared against a leading edge voltage reference at the track comparator 82 to determine if the gate and code should be positioned to a higher altitude, i.e., further into the return (signal lower than reference) or to a lower altitude further out of the return (signal greater than reference). The comparator 82 output is applied to the loop integrator 84 where the altitude voltage is integrated to provide the loop time response characteristics and enhancement of the signal-to-noise ratio. This altitude related voltage is the system non-compensated altitude on line 86.

The altitude voltage is also applied to the voltage to time delay converter 88 which generates a time mark one altitude delay from the reference $T_0$. The generated time mark triggers the receive format generator 90 which produces the range gate pulse and code used to control the range gate 66 and the correlator 70. As altitude varies, the gated signal level varies, which results in the track range gate 66 and correlator 70 time position variations. Thus, through operation of the closed-loop tracker 68, the system maintains accurate range correlation with the return signal.

The mode control switch 78 allows time sharing or multiplexing of the receiver processor electronics between a track mode, a level sensing mode and a noise sampling mode. The period of time sharing is set low enough to provide negligible interruption of the altimeter track function and long enough to provide sufficient track and level loop response times. For example, in eight milliseconds, a valid, unambiguous altitude reading will not change by more than eight feet. Hence, analysis and experimentation have shown that a track period of approximately eight milliseconds, a level sense period of about eight milliseconds and a noise sampling period of about one millisecond have worked quite well, however, other timing may be utilized.

At the end of the eight millisecond track period, mode switch 78 is positioned by the system timing and control 60 to the level sense channel 100 for a period of eight milliseconds. At the same time, the transmit and receive format generator 58 and 90 generate the verification format (FIG. 4), providing the longer pulse repetition interval needed for ambiguous range rejection, all as previously explained. The track loop filter & hold circuit 80 holds the detected level present at the track channel at the average level detected at the end of the track period. The receiver format generator 90 positions the range gate and correlator out from the leading edge of the return pulse. The detected level from detector 76 is band-limited by the level sense filter & hold circuit 92 and applied to the level loop difference amplifier and integrator 56. This circuit regulates the transmit power to thereby maintain the detected return signal at the optimum level reference for accurate leading edge tracking. During a condition where the detected level drops below that which can reliably be tracked, such as when aircraft rollover or ambiguous range detection is involved, the lower threshold detector 94 signals the track logic 98 to break track and to return to the search mode.

At the end of the eight millisecond verification period, switch 78 is next positioned to the noise channel for one millisecond, and at the same time, the transmitter is inhibited, providing KTB receiver noise only at the IF detector 76. The noise detector amplifier 102 functions to hold the receiver gain constant over temperature variations. The noise detector/amplifier 102 sets the receiver gain of the IF amplifier 74 such that the detected noise is held at the noise reference voltage maintained on input line 104. At the end of the one millisecond noise sampling period, switch 78 returns the system to its track mode while the receiver gain is held at the level sectoring the noise sampling period.

During the search mode, when switch 78 is set to the center position, the transmit and receive formats are set to the verification pulse repetition interval and the transmit power level is set to a maximum. System timing and control 60 provides the "search ramp" input to the amplitude to time delay converter 88 which results in the range gate 66 and correlator 70 positioned continuously moving out in time (up in altitude) starting from zero feet. This constitutes the search function.

The return pulse correlator codes are moved out in altitude until the return is detected by the lower threshold detector 94. The level loop amplifier 56 sets the level to the desired reference applied as a second input to the circuit 56. System timing and control 60 then steps the amplitude to time delay converter through the return pulse while monitoring the upper threshold detector 96. By this means, the auto-correlation process results in the main lobe being detected and the tracker is set to this altitude.

Summarizing the operation and with reference again to FIG. 4 and assuming an actual aircraft altitude of 21,000 feet, the radar altimeter of the present invention searches for the return while in the verify format by moving the range gate 66 outbound starting at zero feet. With the 15,000 foot verify mode PRI, there will be two transmit pulses in the air at once: $V_A$ and $V_B$. The return $R_A$ comprises $V_A$ delayed 21,000 feet, but it could be $V_B$ delayed 6,000 feet. Hence, an ambiguous range is involved.

Let is be assumed that the system makes the wrong choice of $V_B$ delayed 6,000 feet. After search and acquisition, the level sensing channel enclosed by the dash line box 100 adjusts the transmit power of transmitter 58 to provide the proper return signal amplitude, all in the verify mode. The radar then switches to the shorter, 14,000 foot, PRI, but with the mode switch still set to the level channel. It positions the gate to 6,000 foot delay after transmit pulse $T_B$. As illustrated in FIG. 4, however, the shorter PRI results in the return at 7,000 feet delay after $T_B$. The level sensing circuitry 100 detects no return at 6,000 feet (the return is 7,000 feet after $V_B$ in the shorter PRI mode), and the track logic 98 breaks track on the ambiguous return and continues searching outbound beyond 6,000 feet for a return. When the range gate reaches 21,000 feet, a return is detected 21,000 feet after $V_A$. Following acquisition, the level channel adjusts the transmit power for proper return amplitude and the system again switches to its shorter PRI at 21,000 feet. The level circuitry detects the return and confirms an unambiguous or valid 21,000 foot altitude. The system switches to the track mode, the tracker loop tracks the proper return at 21,000 feet after transmit pulse $T_A$. Thus, the 6,000 foot ambiguous range is rejected and the 21,000 foot correct return is tracked.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An aircraft pulse Doppler radar altimeter for providing ambiguous range rejection, comprising:
    (a) means for separately transmitting, when enabled, a first and a second sequence of pulses of a first and a second pulse repetition interval, respectively;
    (b) timing and control means for periodically enabling said means for transmitting said first and second sequence of pulses on a time-shared basis;
    (c) receiver means including range gate means for receiving ground return signals corresponding to said first and second sequence of pulses;
    (d) means, including said timing and control means, coupled to said range gate means for continuously adjusting the time following the transmission of the pulses in said first sequence of pulses at which said range gate is enabled until said receiver means detects a ground return signal overlapped by said range gate;
    (e) means responsive to the detection of an overlap of ground return resulting from said first sequence of pulses with said range gate for causing said timing and control means to initiate transmission of said second sequence of pulses and for determining whether a ground return corresponding to said second sequence of pulses is overlapped by the then position of said range gate; and
    (f) means for reinitiating said means coupled to said range gate means when said detection responsive means determines the absence of overlap between said ground return corresponding to said second sequence of pulses and said then position of said range gate means.

2. The aircraft pulse Doppler radar altimeter as in claim 1 and further including:
    (a) closed loop tracking means coupled to said detection responsive means for repositioning said range gate means relative to said ground return corresponding to said second sequence of pulses to maintain the overlap condition when said detection responsive means determines the presence of overlap between said ground return corresponding to said second series of pulse and said then position of said range gate means.

3. The aircraft pulse Doppler radar altimeter as in claim 1 and further including:
    (a) means for periodically inhibiting said means for transmitting while sensing noise signal levels in said receiver means.

4. The aircraft pulse Doppler radar altimeter as in claim 1 and further including:
    (a) means for increasing the power level of said means for transmitting when said first series of pulses is being transmitted and reducing said power level when said second series of pulses is being transmitted.

5. The aircraft pulse Doppler radar altimeter as in claim 1 wherein said means for transmitting includes for means for code modulating said first and second series of pulses and said receiver means includes auto-correlation means for comparing the code modulation of the ground return signals with the code modulating said first and second series of pulses.

6. The aircraft pulse Doppler radar altimeter as in claim 5 and further including means coupling said auto-correlation means to said range gate means for locating the main lobe of said ground return signals.

* * * * *